S. H. PETERS.
FISH LINE SINKER.
APPLICATION FILED MAY 8, 1915.
1,259,664.
Patented Mar. 19, 1918.
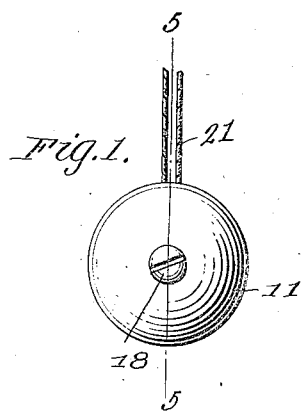
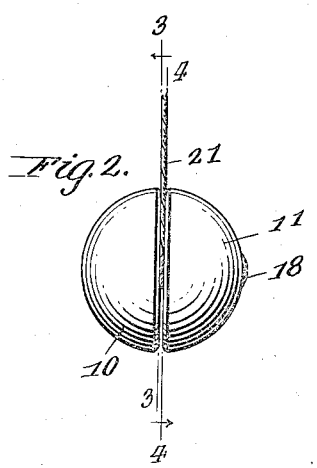
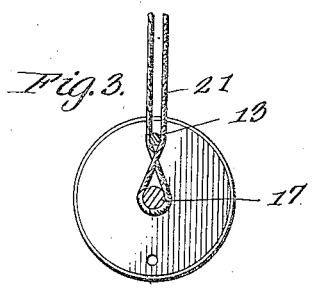
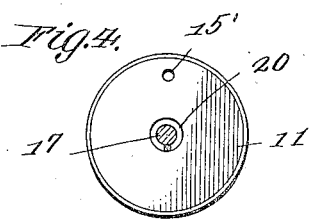
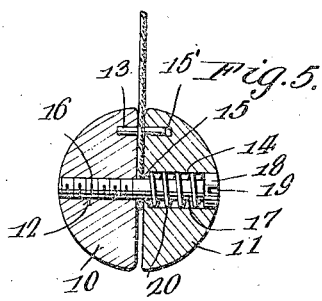
Inventor
Samuel H. Peters

UNITED STATES PATENT OFFICE.

SAMUEL H. PETERS, OF ALLENTOWN, PENNSYLVANIA.

FISH-LINE SINKER.

1,259,664. Specification of Letters Patent. Patented Mar. 19, 1918.

Application filed May 8, 1915. Serial No. 26,832.

*To all whom it may concern:*

Be it known that I, SAMUEL H. PETERS, a citizen of the United States, residing at Allentown, in the county of Lehigh and State of Pennsylvania, have invented certain new and useful Improvements in Fish-Line Sinkers, of which the following is a specification.

This invention relates to sinkers and is especially adapted for use in connection with fishing lines.

The object of this invention is to provide a sinker that is primarily adapted for use as above set forth which is so made as to accommodate lines of different sizes so that the same is applicable for different kinds of fishing.

Another object of this invention is to provide an improved fishing line sinker that is so constructed as to provide means for the engagement of the same with the fishing line so as to positively obviate any likelihood of the line becoming detached from the sinker.

A still further object of this invention is to provide a device of the kind above set forth that is simple in construction, efficient in operation, and consists of a minimum number of parts and, therefore, can be manufactured for the minimum amount.

With these and other objects in view, this invention consists of certain novel constructions, combinations and arrangement of parts, as will be hereinafter fully described and claimed.

In the accompanying drawings:—

Figure 1 is a view in elevation of the improved sinker attached to a line;

Fig. 2 is a view in elevation of the improved device, the same being a view taken at right angles to that as shown in Fig. 1;

Fig. 3 is a section taken on the line 3—3 of Fig. 2;

Fig. 4 is a section taken on line 4—4 of Fig. 2;

Fig. 5 is a section taken on line 5—5 of Fig. 1.

Referring to the parts by reference numerals, this device comprises substantially semi-spherical members 10 and 11, the member 10 having a threaded bore 12 formed therein and a pin 13 secured thereto. The substantially semi-spherical member 11 is provided with a bore 14, the diameter of the same being substantially greater than that of the bore 12 formed in the member 10 and adjacent one end of this bore is a collar 15 for a purpose that will be hereinafter set forth.

A cavity 15' is provided in the member 11, the same being adapted for alinement with the pin 13 of the member 10.

These substantially semi-spherical members 10 and 11 are held together by means of a retaining screw the same having an elongated shank provided with a threaded portion 16, an unthreaded portion 17 and an enlarged head 18 that has formed therein a groove 19 for the reception of a suitable implement. A coil spring 20 is positioned about the unthreaded portion of the screw and the said screw is positioned in the bores 12 and 14, after the same have been alined, the threaded portion 16 thereof being in threaded engagement with the screw threaded bore 12 and the coil spring 20 engaging the collar 15 and the head 18. As is clearly shown in Fig. 5, the pin 13 is positioned in the cavity 15' and the line 21 is passed about the screw and crossed between the pin 13 and the screw thereby providing a positive means for retaining the sinker in connection with the lines. It being obvious that, with the line so placed as shown in Fig. 3, the same is capable of movement but the total displacement thereof is positively obviated.

As is clearly shown in Fig. 5, the coil spring 20 is in abutment with the head 18 of the retaining screw and the collar 15 formed on the section 11 and in that the retaining screw is held fast to the member 10, the said members are yieldably secured together and therefore lines of different sizes can be efficiently retained therebetween. It will be further seen that this spring 20 is efficiently housed by means of the collar 15 and also in that the head 18 of the retaining screw is substantially the same size as the bore 14.

It is obvious that minor changes may be made in the form and construction of this invention without departing from the material parts thereof. It is therefore not wished to confine the invention to the exact form herein shown and described, but it is wished to include all such as properly come within the scope claimed.

What is claimed is:—

1. In a sinker, the combination of two sections, one of said sections having a pin carried thereby and the other of said sections having a depression formed therein for the reception of said pin, said sections provided with alined bores, a retaining screw passed through said bores and in threaded engagement with one of the same, and means in the other of said bores to facilitate the retention of said sections at different distances apart relative to each other whereby the same can receive lines of different sizes.

2. In a sinker, the combination of two sections, one of said sections having a pin carried thereby and the other of said sections having a depression formed therein for the reception of said pin, said sections provided with alined bores, a retaining screw passed through said bores in threaded engagement with one of the same, a coil spring in the other of said bores whereby said sections are yieldably secured together so that lines of different sizes can be secured therebetween.

In testimony whereof I affix my signature in presence of two witnesses.

SAMUEL H. PETERS.

Witnesses:
 HELEN R. OBERLY,
 BESSIE H. KEMMERER.